Patented May 19, 1931

1,805,916

UNITED STATES PATENT OFFICE

ARTHUR LÜTTRINGHAUS, OF MANNHEIM, LUDWIG EIFFLAENDER, OF LUDWIGS-HAFEN-ON-THE-RHINE, AND FILIP KAČER, OF MANNHEIM, GERMANY, ASSIGNORS TO GENERAL ANILINE WORKS, INC., OF NEW YORK, N. Y., A CORPORATION OF DELAWARE

PRODUCTION OF THIOETHERS OF THE ANTHRAQUINONE SERIES

No Drawing. Application filed October 27, 1927, Serial No. 229,262, and in Germany October 30, 1926.

The present invention relates to the production of thio-ethers of the anthraquinone series.

We have found that thio-ethers of the anthraquinone series can be produced by the action of aromatic diazo-compounds on anthraquinone-mercaptanes, or the derivatives or substitution products of the said mercaptanes. Thio-ethers of the anthraquinone series are also obtained by the action of mercaptanes of any desired nature or the derivatives and substitution products thereof on diazo-compounds of anthraquinones. The strongly mineral acid solutions of the diazo-anthraquinones, such as are obtainable according to the usual method of diazotizing amino-anthraquinones, may be directly employed. As a rule excellent yields of the thio-ethers of the anthraquinone series are thereby obtained. The reaction is of particular importance for the production of 1-thioarylanthraquinone-2-carboxylic acids, which are important for industrial purposes, as initial materials for the production of the anthraquinone-thioxanthones.

The following examples will further illustrate how this invention may be carried out in practice, though it must be understood that the invention is not limited thereto. The parts are by weight.

Example 1

155 parts of anthraquinone-1-thiocyanate-2-carboxylic acid, obtainable from 1-diazo-anthraquinone-2-carboxylic acid by heating with potassium thiocyanate and water, are suspended in 3000 parts of water. 300 parts of caustic soda solutions of 40° Baumé are added and the mixture is heated to 70° C. whereupon 5000 parts of cold water are added to the bluish-red solution, the temperature falling to 35° C. A diazo solution, prepared as follows is thereupon poured into this solution: 80 parts of 2.5-dichlor-1-aminobenzene are melted and poured into a boiling mixture of 500 parts of water and 260 parts of concentrated hydrochloric acid; this mixture is cooled, and 220 parts of ice are mixed therewith; a solution of 35 parts of sodium nitrite in 120 parts of water is now run into this mixture as rapidly as possible, care being taken that the temperature does not rise to above 5° C.

After the addition of the diazonium compound, the mixture is heated for so long to a temperature of 40° C., until no more nitrogen is evolved. The reaction product is thereupon precipitated by the addition of an acid. By recrystallizing from nitrobenzene the anthraquinone-1-thio-2'.5'-dichlorophenyl-2-carboxylic acid is obtained in the form of golden-yellow needles having the melting point 298° C. By heating with concentrated sulfuric acid to from 90 to 100° C., the product is converted into the corresponding thioxanthrone, which dyes cotton from a bluish-violet vat golden-yellow shades. The dyestuff is preferably treated for purification with dilute boiling sodium hypochlorite solution.

A chlormethoxyphenylthio-anthraquinone-carboxylic acid is obtained in an analogous manner from the diazo-compound of 4-chlor-2-amino-1-methoxybenzene. The said thiocompound gives a dyestuff by ring-formation, which dyes cotton reddish-brown from a bluish-violet vat. From the diazo-compound of m-chloraniline a m-chlorphenylthio-anthraquinone-carboxylic acid is obtained in an analogous manner, which can be converted into an orange colored vat dyestuff. 2-diazo-anthraquinone yields a 1.2'-dianthraquinonylsulfid-2-carboxylic acid, from which a yellow vat dyestuff can be obtained.

Example 2

A solution of anthraquinone-1.2-isoxazol in sulfuric acid is prepared from 25 parts of 1-nitro-2-methyl-anthraquinone in accordance with Example 1 of the U. S. Patent 1,417,875 and the said isoxazol converted in the same solution into 1-diazo-anthraquinone-2-carboxylic acid according to the process described in Example 1 of the U. S. Patent 1,700,790.

25 parts of sodium anthraquinone-2-mercaptide dissolved in 500 parts of water are stirred into this still strongly sulfuric acid solution at ordinary temperature. A yellow precipitate of 1.2'-dianthraquinonylsulfid-2- carboxylic acid is thus obtained, while nitrogen is evolved. The mixture is brought to the boil, filtered by suction, the precipitate washed with water and dried.

The product is identical with the β-thio-anthraquinonyl-1-anthraquinone-2-carboxylic acid described in the U. S. Patent No. 1,018,837.

*Example 3*

18 parts of 2.5-dichlor-1-mercapto-benzene are dissolved in 400 parts of water and 30 parts of caustic soda solution of 30° Baumé and stirred at room temperature into a strongly sulfuric acid solution of 1-diazo-anthraquinone-2-carboxylic acid obtainable from 25 parts of 1-nitro-2-methylanthraquinone according to Example 2. A yellow precipitate of anthraquinone-1-thio-2.5′-dichlorphenyl-2-carboxylic acid is thus obtained with evolution of nitrogen. The mixture is brought to the boil, filtered by suction, and the precipitate washed with water and dried. In order to obtain the carboxylic acid entirely pure, the crude product may be boiled up with water and magnesia, the insoluble impurities being then filtered off, and the pure product precipitated from the yellow solution of the magnesium salt by the addition of hydrochloric acid. The readily crystallizing sodium salt is also very suitable for the purification of the acid.

If instead of 2.5-dichlormercaptobenzene other mercaptanes are employed, for example butyl mercaptane or thio-glycolic acid, the corresponding thio-ethers are obtained, for example anthraquinone-1-thiobutyl-2-carboxylic acid or anthraquinone-1-thioglycolic acid-2-carboxylic acid.

*Example 4*

11.9 parts of 1.5-diaminoanthraquinone are dissolved at room temperature in 120 parts of sulfuric acid of 66° Baumé strength and 40 parts of nitrosylsulfuric acid, containing about 13 per cent of nitrous acid, are added to this solution. The whole is thoroughly mixed and then stirred into crushed ice. The diazo-sulfate which separates out, is filtered off by suction and stirred into about 300 parts of water. A solution of 13 parts of p-thio-cresol in 50 parts of caustic soda solution of 40° Baumé strength and 500 parts of water is stirred into this suspension. After standing for some time, the mixture is brought to boiling, filtered by suction, the precipitate washed, until the wash-water shows neutral reaction, and thereupon dried. The product thus obtained is 1.5-di-p-tolylthio-anthraquinone (see Liebig's Annalen, vol. 393, page 184).

What we claim is:

1. The process of producing anthraquinone-1-thiochlorophenyl-2-carboxylic acids, which consists in acting on a 1-diazoanthraquinone-2-carboxylic acid with a chlor-mercapto-benzene and heating the reaction mixture until no more nitrogen is evolved.

2. The process of producing anthraquinone-1-thio-2′.5′-dichlorphenyl-2-carboxylic acid, which consists in acting on 1-diazo-anthraquinone-2-carboxylic acid with 2.5-dichlor-1-mercapto-benzene and heating the reaction mixture until no more nitrogen is evolved.

3. The process of producing anthraquinone-2-carboxy-1-thioethers, which consists in acting on a 1-diazo-anthraquinone-2-carboxylic acid with an aromatic mercaptan, and heating the reaction mixture until no more nitrogen is evolved.

4. The process of producing anthraquinone-2-carboxy-1-thioethers which comprises acting on an anthraquinone-2-carboxylic acid with an aromatic compound, one of the said components containing a mercapto, the other a diazo group, the anthraquinone-2-carboxylic acid containing one of the said groups in the 1-position.

In testimony whereof we have hereunto set our hands.

ARTHUR LÜTTRINGHAUS.
LUDWIG EIFFLAENDER.
FILIP KAČER.